(12) United States Patent
Kajio

(10) Patent No.: US 11,258,079 B2
(45) Date of Patent: Feb. 22, 2022

(54) HUMIDIFICATION DEVICE

(71) Applicant: AISIN SEIKI KABUSHIKI KAISHA, Kariya (JP)

(72) Inventor: Katsuhiro Kajio, Kariya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 167 days.

(21) Appl. No.: 16/702,698

(22) Filed: Dec. 4, 2019

(65) Prior Publication Data

US 2020/0251756 A1 Aug. 6, 2020

(30) Foreign Application Priority Data

Feb. 1, 2019 (JP) .............................. JP2019-016754

(51) Int. Cl.
*H01M 8/04119* (2016.01)
*B60H 3/02* (2006.01)

(52) U.S. Cl.
CPC ........ *H01M 8/04126* (2013.01); *B60H 3/022* (2013.01)

(58) Field of Classification Search
CPC .......... H01M 8/04126; H01M 8/04141; B60H 3/022
See application file for complete search history.

(56) References Cited

U.S. PATENT DOCUMENTS

| | | | |
|---|---|---|---|
| 2017/0077531 A1* | 3/2017 | Kim ................. | H01M 8/04141 |
| 2019/0015787 A1* | 1/2019 | Oh ........................ | B01D 63/04 |
| 2019/0081335 A1* | 3/2019 | Shinozaki ......... | H01M 8/04014 |
| 2019/0326618 A1* | 10/2019 | Oh .................... | H01M 8/04835 |
| 2019/0348694 A1* | 11/2019 | Kagami ............ | H01M 8/04302 |

FOREIGN PATENT DOCUMENTS

JP 2011-60638 A 3/2011

* cited by examiner

*Primary Examiner* — Stewart A Fraser
(74) *Attorney, Agent, or Firm* — Oblon, McClelland, Maier & Neustadt, L.L.P.

(57) ABSTRACT

A humidification device includes a humidification section that humidifies taken-in air and a cover that covers the humidification section. A space is provided between the humidification section and the cover. A supply port for sending out humidified air humidified by the humidification section is further provided. The space communicates with the supply port, and the humidified air flows through the space, thereby utilizing air in the space as a heat insulation layer.

5 Claims, 3 Drawing Sheets

HUMIDIFICATION DEVICE

CROSS REFERENCE TO RELATED APPLICATIONS

This application is based on and claims priority under 35 U.S.C. § 119 to Japanese Patent Application No. 2019-016754, filed on Feb. 1, 2019, the entire content of which is incorporated herein by reference.

TECHNICAL FIELD

This disclosure generally relates to a humidification device.

BACKGROUND DISCUSSION

JP2011-60638A (Reference 1) proposes, as a humidification device, a configuration in which a plurality of fuel battery cells are sandwiched between two end plates, and a humidification device (a humidifier in the Reference 1) is provided at an outer surface of one of the two end plates.

The humidification device described in the Reference 1 is configured so as to be attached to the outer surface of the end plate and to supply humidified air to a fuel cell unit via a conduit (a connection pipe in the Reference 1).

For example, the humidified air to be supplied to the fuel battery cells needs to have a predetermined temperature. Particularly, when the humidification device has a configuration easily dissipating heat, a temperature decrease accompanying the heat dissipation causes a decline in electric power generation performance of the fuel battery cells. Further, in the configuration of supplying humidified air via a conduit as described in the Reference 1, an additional component used in the conduit is necessary, and for this reason, the number of components increases, a step for making connection of the conduit is further necessary, and thus room for improvement exists.

A need thus exists for a humidification device which is not susceptible to the drawback mentioned above.

SUMMARY

A humidification device according to this disclosure includes a humidification section that humidifies taken-in air and a cover that covers the humidification section. A space is provided between the humidification section and the cover. A supply port for sending out humidified air humidified by the humidification section is further provided. The space communicates with the supply port, and the humidified air flows through the space.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of this disclosure is described with reference to the drawings.

[Basic Configuration]

Figure 1:
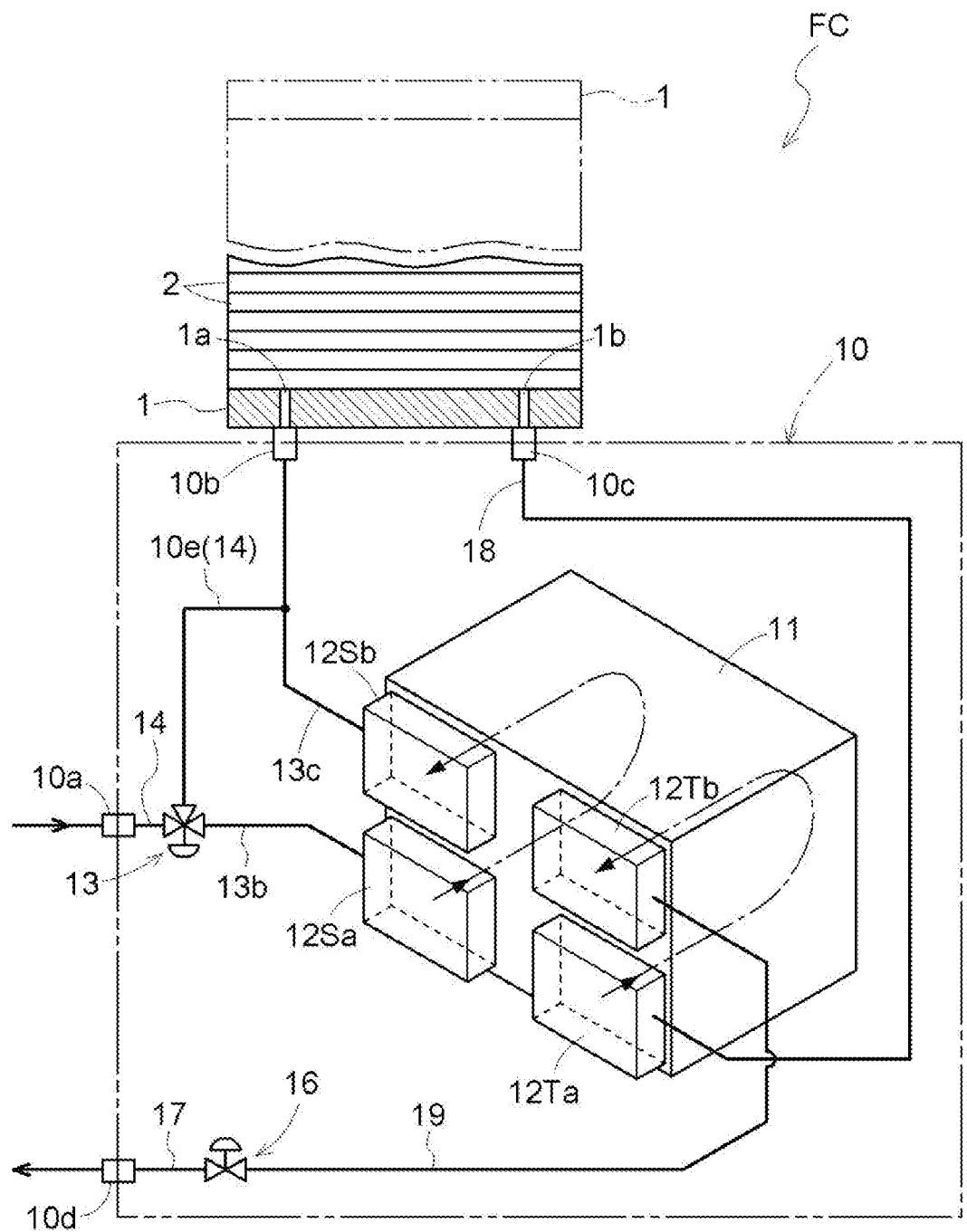
FIG. 1 is a diagram schematically illustrating a gas path and the like of a fuel cell unit.

As illustrated in FIG. 1, a fuel cell unit FC is configured in such a way that a plurality of fuel battery cells 2 are arranged in a stacked state at a position sandwiched between two end plates 1, and a humidification device 10 is provided at an outer surface of one of the end plates 1.

This fuel cell unit FC represents what is provided in a fuel cell vehicle (FCV). Although not illustrated in the drawings, there is provided a hydrogen supply section supplying a hydrogen gas (anode gas) to an outer surface of the end plate 1 that is among the two end plates 1 of the fuel cell unit FC and that is on a side opposite to the side where the humidification device 10 is arranged.

Further, in the fuel cell unit FC, a hydrogen gas (anode gas) from the hydrogen supply section is supplied to anodes of a plurality of the fuel battery cells 2, and simultaneously with this supply, outside air (hereinafter, referred to as a cathode gas) is supplied to cathodes of a plurality of the fuel battery cells 2, and thereby, electric power is generated.

As a result of this reaction, an oxygen concentration at the cathode of the fuel battery cell 2 decreases, and air (cathode off-gas) including moisture generated by the reaction is discharged. Particularly, since the reaction in the cathode gas is exothermic reaction, a temperature of the cathode off-gas increases, and a temperature of the moisture included in the cathode off-gas also increases.

As illustrated in FIG. 1, in the end plate 1 at which the humidification device 10 is provided, there are formed an intake hole $1a$ for supplying the cathode gas (outside air) to the cathodes of a plurality of the fuel battery cells 2, and a discharge hole $1b$ for discharging the after-reaction air (cathode off-gas).

According to the fuel cell unit FC, in order that high-temperature moisture included in the cathode off-gas can be used, the humidification device 10 is configured as a temperature-humidity exchange type in such a way that, in the humidification device 10, moisture and heat are taken in from the cathode off-gas, and the thus-taken-in moisture and heat are given to the cathode gas. The temperature-humidity exchange is described below.

[Humidification Device]

Figure 2:
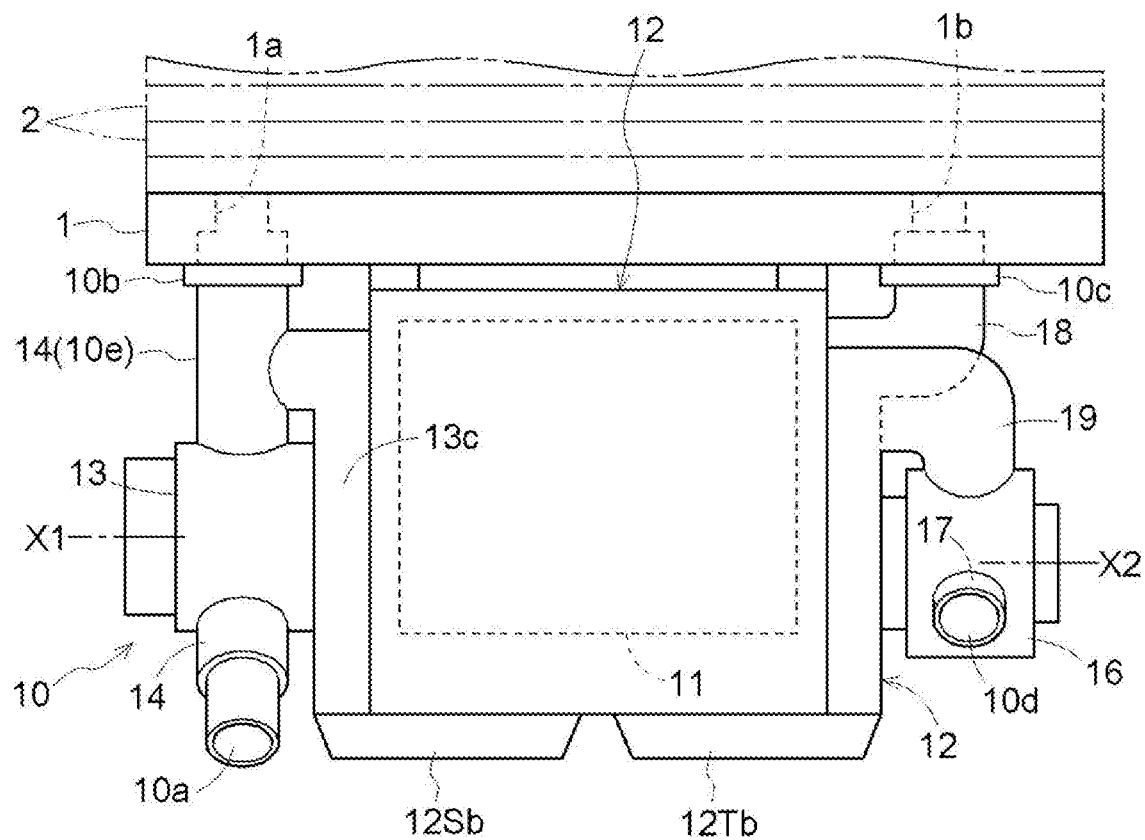
FIG. 2 is a plan view of a humidification device.
Figure 3:
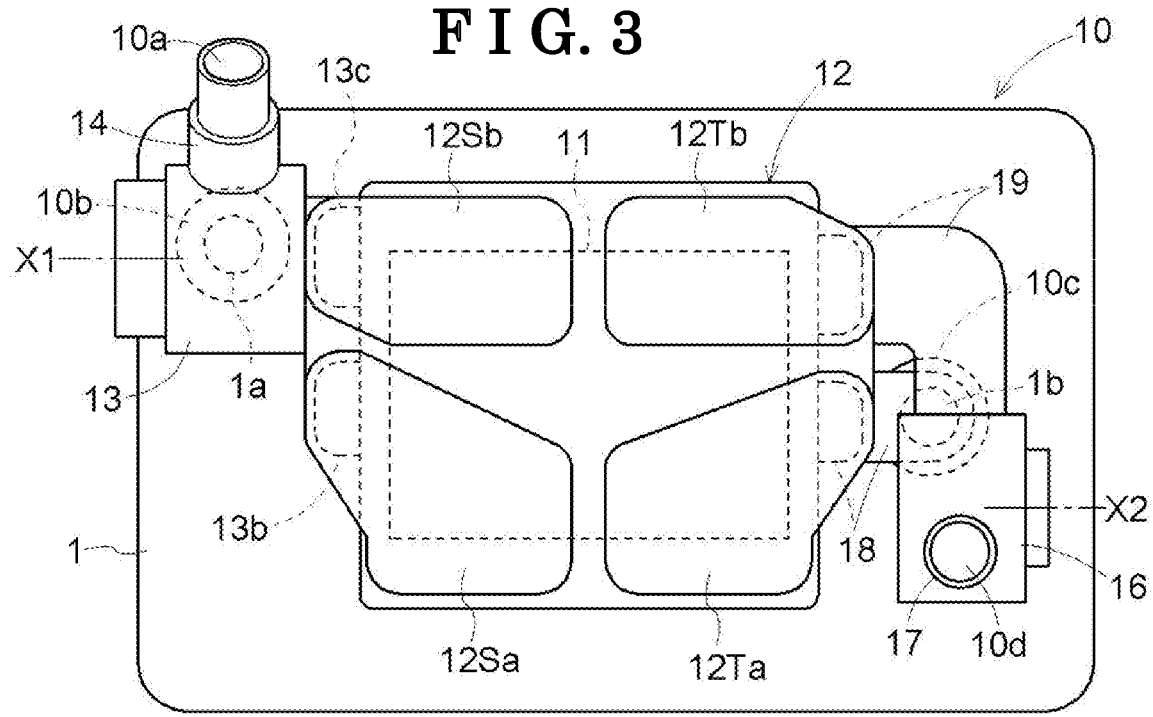
FIG. 3 is a front view of the humidification device.

As illustrated in FIGS. 1 to 3, the humidification device 10 is provided with an intake port $10a$ for taking in outside air as the cathode gas, the supply port $10b$ for supplying the cathode gas to the fuel battery cell 2, an introduction port $10c$ for receiving the cathode off-gas discharged from the fuel battery cell 2, and a discharge port $10d$ for discharging the cathode off-gas. Note that the cathode off-gas discharged from the discharge port $10d$ is discharged to an outside via a vehicle muffler or the like.

In this embodiment, a right side of each of FIG. 2 and FIG. 3 is defined as a right side (a right part or the like) of the humidification device 10, a side opposite to this side is defined as a left side (a left part or the like), and a lower side of FIG. 2 is defined as a front side (a front part or the like) of the humidification device 10, a side (a side closer to the end plate 1) opposite to this side is defined as a rear side (a rear part or the like), an upper side of FIG. 3 is defined as an upper side (an upper part or the like) of the humidification device 10, a side opposite to this side is defined as a lower side (a lower part or the like), and in accordance with this definition, positional relations between respective parts of the humidification device 10 are clarified in the following description.

Figure 4:
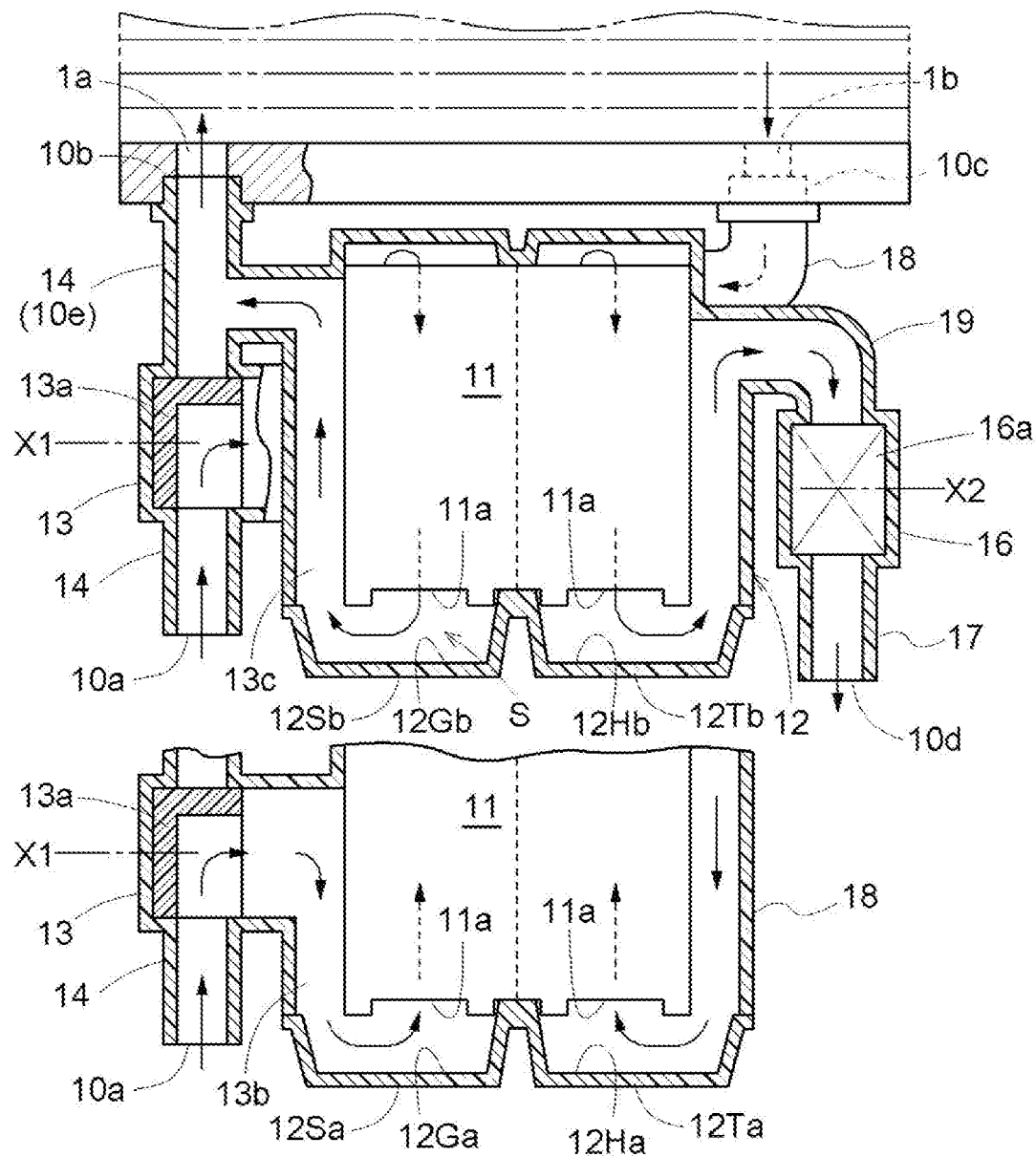
FIG. 4 is a cross-sectional view of the humidification device illustrating a gas flow when a cathode gas is humidified.

As illustrated in FIGS. 2 to 4, the humidification device 10 houses a humidification section 11 in a resin-made housing 12, includes an intake control valve 13 (one example of a valve mechanism) provided at a left outer surface of the housing 12 and constituted of a three-way valve, and includes an exhaust control valve 16 provided at a right outer surface of the housing 12 and functioning as a pressure regulation valve.

[Humidification Device: Humidification Section]

Although details are not illustrated in the drawings, the humidification section 11 is configured by stacking a plurality of humidification units. The humidification unit is structured so as to include a moisture retention film whose one surface functions as a humidification surface and whose other surface functions as a moisture absorption surface, with the moisture retention film being arranged between a pair of thin-plate-shaped separators so as to be at predetermined intervals therefrom. In this humidification unit, an area that is among areas between the separators and the moisture retention film and in which the humidification surface is exposed is a humidification area, and an area that is among the areas between the separators and the moisture retention film and in which the moisture absorption surface is exposed is a moisture absorption area.

The humidification section 11 and the housing 12 are structured in such a way that the cathode gas taken in from the intake port 10*a* is not mixed with the cathode off-gas introduced from the introduction port 10*c*.

Particularly, as illustrated in FIGS. 2 to 4, the humidification section 11 is structured so as to allow gas to flow in front-rear directions at a left block and a right block a boundary of each of which is a center in a left-right direction. In the left block, the cathode gas flows in the humidification area (the humidification area of each of a plurality of the humidification units) between a front surface and a rear surface, and in the right block, the cathode off-gas flows in the moisture absorption area (the moisture absorption area of each of a plurality of the humidification units) between a front surface and a rear surface. Further, the moisture retention film is arranged in an area ranging from the left block to the right block.

Thereby, by supplying the cathode off-gas to the right block in the humidification section 11, high-temperature moisture included in the cathode off-gas is taken into the moisture retention film, and the moisture and heat are removed from the cathode off-gas (the cathode off-gas is dehumidified and deheated). Then, by supplying the cathode gas to the left block in the humidification section 11, high-temperature moisture included in the moisture retention film is given to the cathode gas, and humidifying and heating of the cathode gas are implemented.

[Humidification Device: Intake Control Valve]

As illustrated in FIGS. 2 to 4, the intake control valve 13 includes a first valve body 13*a* (refer to FIG. 4) incorporated in a resin-made body thereof and rotatable around a first valve axis X1, and includes a main conduit 14 in a posture orthogonal to the first valve axis X1. The main conduit 14 is arranged at a position penetrating through the intake control valve 13, and includes one end portion where the intake port 10*a* is formed, and the other end portion where the supply port 10*b* is formed. Although not illustrated in the drawings, an electric motor is included in the intake control valve 13 with the electric motor being at an outer surface of the intake control valve 13 and rotating the first valve body 13*a* around the first valve axis X1.

The intake control valve 13 includes a branch conduit 13*b* for sending out the cathode gas from the body thereof. Further, a merging conduit 13*c* is connected, near the supply port 10*b*, to the main conduit 14. Further, the main conduit 14 is arranged at the position penetrating through the intake control valve 13, and for this reason, when the first valve body 13*a* of the intake control valve 13 is operated to a bypass position (not illustrated), the cathode gas (outside air) from the intake port 10*a* can be sent out directly to the supply port 10*b* without being sent out to the branch conduit 13*b*, and the main conduit 14 functions as a bypass 10*e*.

The intake control valve 13 is fixed to the outer surface of the housing 12 of the humidification device 10, the branch conduit 13*b* for sending the cathode gas is welded to the outer surface of the housing 12, and the merging conduit 13*c* for sending the humidified cathode gas is connected by welding between the housing 12 and the main conduit 14. Note that, at these welded locations, connection may be made by adhesion instead of welding.

The intake control valve 13 is configured in such a way that rotation of the first valve body 13*a* around the first valve axis X1 can switch the intake control valve 13 to a humidification position (position illustrated in FIG. 4) of supplying, to the humidification section 11, the cathode gas from the intake port 10*a* while blocking an air flow to the bypass 10*e*, to a bypass position (not illustrated) of supplying air to the bypass 10*e* while blocking a flow of the cathode gas from the intake port 10*a* to the humidification section 11, and to a block position (not illustrated) of blocking air from the intake port 10*a*.

With such a configuration, in the case of being operated to the humidification position illustrated in FIG. 4, the intake control valve 13 takes in outside air as the cathode gas from the intake port 10*a*, and supplies the taken-in cathode gas to the housing 12 via the branch conduit 13*b*, further causing the cathode gas humidified and heated by the humidification section 11 to be merged from the merging conduit 13*c* into a rear end side in the main conduit 14 and to be further sent out to the supply port 10*b*.

In the case of being operated to the bypass position, the intake control valve 13 sends, as the cathode gas, outside air taken in from the intake port 10*a*, directly to the supply port 10*b* without being humidified and heated. In other words, the main conduit 14 is made to function as the bypass 10*e*.

In the case of being operated to the block position, the intake control valve 13 blocks intake of air at the intake port 10*a*, and stops supply of the cathode gas to the supply port 10*b*.

[Humidification Device: Exhaust Control Valve]

As illustrated in FIGS. 2 to 4, the exhaust control valve 16 functions as a pressure regulation valve, and includes a second valve body 16*a* (refer to FIG. 4) being incorporated in a resin-made body and being rotatable around the second valve axis X2. The exhaust control valve 16 includes a resin-made discharge conduit 17 for sending out the cathode off-gas, and at a discharge-side end portion of the discharge conduit 17, a discharge port 10*d* is formed. Although not illustrated in the drawings, an electric motor that rotates the second valve body 16*a* around the second valve axis X2 is provided at an outer surface of the exhaust control valve 16.

An introduction conduit 18 is provided at a right side surface of the housing 12, and at a rear end portion of the introduction conduit 18, the introduction port 10*c* is formed. Further, a restoration conduit 19 is provided between the housing 12 and the exhaust control valve 16.

In the humidification device 10, the introduction conduit 18 is integrated with the outer surface of the housing 12 (or is welded thereto after integral molding), the restoration conduit 19 is welded between the exhaust control valve 16 and the housing 12, and the exhaust control valve 16 is supported by the housing 12 of the humidification device 10 via the introduction conduit 18 and the restoration conduit 19.

[Humidification Device: Cover and the Like]

As illustrated in FIGS. 2 to 4, a front portion of the housing 12 of the humidification device 10 is open, and a single closing member (one example of a cover) is provided so as to cover this open portion. The closing member includes a first intake cover 12Sa and a second intake cover 12Sb that are arranged at a lower position and an upper position respectively on a left side in the front portion of the housing 12, and includes a first discharge cover 12Ta and a second discharge cover 12Tb that are arranged at a lower position and an upper position respectively on a right side in the front portion of the housing 12.

According to this embodiment, in the illustrated configuration, four kinds of covers are provided in the single closing member, but instead of the configuration using the single closing member, for example, the first intake cover 12Sa and the second intake cover 12Sb may be provided at the lower position and the upper position on the left side in the front portion of the housing 12, and the first discharge cover 12Ta and the second discharge cover 12Tb may be provided at the lower position and the upper position on the right side in the front portion of the housing 12.

As illustrated in FIGS. 2 to 4, left end portions of the first intake cover 12Sa and the second intake cover 12Sb overhang outward from the left side surface of the housing 12, and the branch conduit 13b communicates with the overhang portion of the first intake cover 12Sa, and the merging conduit 13c communicates with the overhang portion of the second intake cover 12Sb.

Similarly to this, the right end portions of the first discharge cover 12Ta and the second discharge cover 12Tb overhang outward from the right side surface of the housing 12, the introduction conduit 18 communicates with the overhang portion of the first discharge cover 12Ta, and the restoration conduit 19 communicates with the overhang portion of the second discharge cover 12Tb. The first intake cover 12Sa, the second intake cover 12Sb, the first discharge cover 12Ta, and the second discharge cover 12Tb do not communicate with each other at the front portion of the housing 12.

Each of the first intake cover 12Sa, the second intake cover 12Sb, the first discharge cover 12Ta, and the second discharge cover 12Tb is formed in a shape in which a front side thereof swells outward, and by this formation, four guide surfaces (a first intake guide surface 12Ga, a second intake guide surface 12Gb, a first discharge guide surface 12Ha, and a second discharge guide surface 12Hb) that are gradually recessed are formed inside.

Accordingly, when the intake control valve 13 is operated to the humidification position illustrated in FIG. 4, as illustrated in a lower part of FIG. 4, the cathode gas taken in from the intake port 10a passes through the intake control valve 13, and is supplied from the branch conduit 13b to an inside of the first intake cover 12Sa. Then, the cathode gas contacts with the first intake guide surface 12Ga inside the first intake cover 12Sa, is thereby guided to a front surface of the humidification section 11, is directed to a rear surface on a rear side in the humidification section 11 in a pattern of passing from this front surface through an inside (a plurality of the humidification areas) of the humidification section 11, and then flows backward. At this time, the cathode gas is humidified and heated.

Next, as illustrated in an upper part of FIG. 4, the cathode gas flowing out from the rear surface of the humidification section 11 flows to the front surface of the humidification section 11 in a pattern of passing in an upper portion of the humidification section 11 through an inside (a plurality of the humidification areas) of the humidification section 11 from the rear surface toward the front surface, and flows out from the humidification section 11. The cathode gas thus flowing out from the front surface of the humidification section 11 contacts with the second intake guide surface 12Gb inside the second intake cover 12Sb, is thereby guided to the merging conduit 13c, is further merged into the main conduit 14, and is supplied to the supply port 10b.

In other words, the cathode gas reciprocates once between the front surface and the rear surface of the humidification section 11, thereby implementing efficient humidifying and heating. Particularly, as illustrated in the upper part of FIG. 4, a sending-out space S is formed between an inner surface of the second intake cover 12Sb and the front surface of the humidification section 11, and the humidified cathode gas flows in the sending-out space S, thereby causing this cathode gas (the sending-out space S) to function as a heat insulation layer, and suppressing temperature change of the humidification section 11.

Further, as illustrated in the upper part of FIG. 4, a volume of the sending-out space S is increased by forming a recess 11a on the front surface of the humidification unit 11, and the humidified cathode gas is sent to the sending-out space S thus increased in a volume, thereby, a thickness of a layer of the cathode gas is increased, and the heat insulation function of the humidified cathode gas is further improved.

Further, as illustrated in the lower part of FIG. 4, the cathode off-gas sent out from the fuel battery cells 2 to the introduction port 10c contacts, from the introduction conduit 18, with the first discharge guide surface 12Ha inside the first discharge cover 12Ta, is thereby guided to the front surface in the humidification section 11, and flows toward the rear surface on the rear side of the humidification section 11 in a pattern of passing from this front surface through an inside (a plurality of the moisture absorption areas) of the humidification section 11. At this time, the cathode off-gas is dehumidified and deheated.

Next, as illustrated in the upper part of FIG. 4, the cathode off-gas flowing out from the rear surface of the humidification section 11 flows to the front surface of the humidification section 11 in a pattern of passing in the upper portion of the humidification section 11 through an inside (a plurality of the moisture absorption regions) of the humidification section 11 from the rear surface toward the front surface, and flows out from the humidification section 11. The cathode off-gas thus flowing out from the front surface of the humidification section 11 contacts with the second discharge guide surface 12Hb inside the second discharge cover 12Tb, is thereby guided to the restoration conduit 19, and is further discharged from the discharge port 10d through the exhaust control valve 16.

This cathode off-gas also reciprocates once between the front surface and the rear surface of the humidification section 11, thereby implementing efficient removal of moisture and heat (dehumidifying and deheating).

As illustrated in FIG. 4, the recess 11a is formed at a location that is in the front surface of the humidification section 11 and to which the cathode gas is supplied from the first intake cover 12Sa. Similarly to this, recesses 11a are also formed at locations that are in the humidification section 11 and that face the first discharge cover 12Ta and the second discharge cover 12Tb. Thereby, a volume of a space for supplying the cathode gas to the humidification section 11 and a volume of a space for sending out the cathode gas are increased, and a volume of a space for supplying the cathode off-gas to the humidification section 11 and a volume of a space for sending out the cathode off-gas are increased.

Advantageous Effects of Embodiment

In the fuel cell unit FC, the humidification section 11 is configured as the temperature-humidity exchange type, and thus, the humidification section 11 humidifies and heats the cathode gas taken in from the intake port 10a, and sends out this cathode gas to the merging conduit 13c. Further, there is implemented a process in which the humidification section 11 removes moisture and heat included in the cathode off-gas from the introduction port 10c (performs dehumidifying and deheating), and sends out this cathode off-gas to the restoration conduit 19.

The humidification device 10 is structured so as to house the humidification section 11 in the housing 12, includes the intake control valve 13 and the exhaust control valve 16 outside in a position-fixed state, and includes the supply port 10b and the introduction port 10c at positions fixed in relation to the humidification device 10. For this reason, when the humidification device 10 is fixed to the end plate 1, it is possible to easily perform a step of fitting the supply port 10b into the intake hole 1a of the end plate 1, and a step of fitting the introduction port 10c into the discharge hole 1b of the end plate 1. Particularly, in this configuration, an increase in the number of components can be suppressed and the number of work steps can be decreased as compared with a case in which paths (conduits) for sending gas are formed by attaching hoses or tubes, for example.

Further, in a state where the humidification device 10 is fixed to the end plate 1, a gap is formed between the end plate 1 and a surface that is included in the housing 12 of the humidification device 10 and that faces the end plate 1. Thereby, even when the housing 12 is deformed due to thermal expansion, it is prevented that a part of the housing 12 comes into contact against the end plate 1 and the humidification device 10 is displaced in a direction of dislocating the humidification device 10 from a set position.

Particularly, the configuration is made in such a way that the cathode gas humidified and heated by the humidification section 11 is caused to flow along the second intake guide surface 12Gb inside the second intake cover 12Sb, and for this reason, the cathode gas flowing in the sending-out space S inside the second intake cover 12Sb can be caused to function as a heat insulation layer while the sending-out space S inside the second intake cover 12Sb can be used as a conduit for allowing the cathode gas to flow therethrough. Further, even when temperature change outside the housing 12 is large, temperature change of the humidification section 11 is suppressed. Furthermore, forming the recess 11a in the humidification section 11 increases a volume of the sending-out space S and implements further improvement of a heat insulation effect of the cathode gas. Similarly to the second intake cover 12Sb, as to the first intake cover 12Sa, the first discharge cover 12Ta, and the second discharge cover 12Tb, spaces inside the covers can be used as conduits for allowing gas to flow therethrough, and the flowing-through gas can be caused to function as heat insulation layers.

Other Embodiments

In addition to the above-described embodiment, this disclosure may be configured as follows (the same numerals and symbols as those in the embodiment are attached to elements having the same functions as those in the embodiment).

(a) A heat insulator is provided on an inner surface or an outer surface of the second intake cover 12Sb, and this cover is made to have a double structure or a plural-layer structure, thereby improving a heat insulation effect. With such a configuration, temperature change of the humidification section 11 can be suppressed, and electric power generation performance in the fuel battery cells 2 can be kept high.

(b) Although, in the embodiment, four types of covers of the first intake cover 12Sa, the second intake cover 12Sb, the first discharge cover 12Ta, and the second discharge cover 12Tb are arranged at the front surface of the housing 12, the humidification device 10 is configured in such a way that only a cover corresponding to the second intake cover 12Sb is provided at the housing 12.

In other words, a pattern of supplying the cathode gas to the humidification section 11 is not limited to that represented in the embodiment, and only at an area to which the cathode gas in a humidified and heated state is sent out, a cover (the cover corresponding to the second intake cover 12Sb) is provided so as to form the sending-out space S, thereby, when the humidified cathode gas flows in the sending-out space S, this cathode gas can be caused to function as a heat insulation layer.

(c) For example, a valve mechanism (e.g., a three-way valve) is housed in a housing space formed outside the housing 12 and integrally with the housing 12, thereby, support strength of the valve mechanism is increased, and a conduit for sending gas to an inside of the housing 12 is integrally formed. Further, the supply port 10b and the introduction port 10c are formed integrally with the housing 12.

With such a configuration, a position of the valve mechanism is stabilized, and when the humidification device 10 is attached to the end plate 1, positional precision between the supply port 10b and the introduction port 10c is improved.

(d) By combining a plurality of on-off valves, the intake control valve 13 is configured so as to function similarly to the three-way valve. Further, a three-way valve or the like is used as the exhaust control valve 16, thereby making a configuration in which the cathode gas to be supplied to the intake port 10a is merged with the cathode off-gas discharged from the discharge port 10d.

INDUSTRIAL APPLICABILITY

This disclosure can be used in a humidification device provided in a fuel battery.

A humidification device according to this disclosure includes a humidification section that humidifies taken-in air and a cover that covers the humidification section. A space is provided between the humidification section and the cover. A supply port for sending out humidified air humidified by the humidification section is further provided. The space communicates with the supply port, and the humidified air flows through the space.

According to this characteristic configuration, the space is formed between the humidification section and the cover, and thus, air in this space serves as a heat insulation layer that suppresses heat conduction between an outside of the cover and the humidification section, thereby, an inconvenience of changing a temperature of the humidification section is not caused. Further, the humidified air humidified by the humidification section can be caused to flow through the space between the humidification section and the cover, be sent to the supply port, and be sent out from this supply port to an outside.

For this reason, the humidification device that can suppress temperature change of the humidification section is configured. Further, with this configuration, temperature change of the humidified air sent out from the supply port can be also suppressed while temperature change of the humidification section is suppressed.

In the space, a surface that is among surfaces constituting the humidification section and that faces the cover may include a recess recessed toward the humidification section.

According to this configuration, the cover is arranged at a position that covers the recess in the humidification section, and thus, a volume of the space for sending the humidified air is increased, and a thickness of a layer of the humidified air sent to the space is increased, thereby, a satisfactory heat insulation function is achieved.

The humidification device may further include an intake port for taking in outside air, a valve mechanism that controls a flow of air taken in from the intake port, and a bypass for merging, into the supply port, air controlled by the valve mechanism. The valve mechanism may be configured so as to be switchable to a humidification position of supplying air from the intake port to the humidification section while blocking an air flow to the bypass, to a bypass position of supplying air to the bypass while blocking an air flow from the intake port to the humidification section, and to a block position of blocking air from the intake port.

According to this configuration, operating the valve mechanism to the humidification position allows outside air to be supplied to the humidification device, thereby, the humidified air humidified by the humidification device can be supplied to the supply port. Further, operating the valve mechanism to the bypass position allows outside air to be sent to the bypass and to be then supplied to the supply port with the outside air not being supplied to the humidification device. Furthermore, operating the valve mechanism to the block position can generate a state in which neither air nor humidified air is supplied to the supply port.

The supply port may be supported by an end plate adjacent to the humidification section in a state where the supply port is connected to an intake hole formed in the end plate.

According to this configuration, humidified air can be supplied directly to the intake hole of the end plate from the supply port without using a conduit such as a hose or a tube, an increase in the number of components of the humidification device is suppressed, and assembling becomes easy.

In order to achieve the above-described advantageous effect, the following configuration may be adopted. Specifically, in a configuration, humidified air from the humidification section may be thermally insulated by a heat insulation structure of an inner surface of the cover, or in another configuration, the supply port may be formed integrally with the cover covering the humidification section, and may be connected to a supply port formed in an end plate being provided at an end portion of a fuel cell unit, thereby achieving the advantageous effect.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A humidification device comprising:
a humidification section that humidifies taken-in air;
a supply port for sending out humidified air humidified by the humidification section;
a cover that covers the humidification section;
an intake port for taking in outside air;
a valve mechanism that controls a flow of air taken in from the intake port; and
a bypass for merging, into the supply port, air controlled by the valve mechanism, wherein
a space is provided between the humidification section and the cover,
the space communicates with the supply port, and humidified air flows through the space, and
the valve mechanism is configured so as to be switchable to a humidification position of supplying air from the intake port to the humidification section while blocking an air flow to the bypass, to a bypass position of supplying air to the bypass while blocking an air flow from the intake port to the humidification section, and to a block position of blocking air from the intake port.

2. The humidification device according to claim 1, wherein, in the space, a surface that is among surfaces constituting the humidification section and that faces the cover includes a recess recessed toward the humidification section.

3. The humidification device according to claim 1, wherein the supply port is supported by an end plate adjacent to the humidification section in a state where the supply port is connected to an intake hole formed in the end plate.

4. The humidification device according to claim 1, wherein humidified air from the humidification section is thermally insulated by a heat insulation structure of an inner surface of the cover.

5. The humidification device according to claim 1, wherein the supply port is formed integrally with the cover covering the humidification section, and is connected to a second supply port formed in an end plate being provided at an end portion of a fuel cell unit.

* * * * *